US012668960B2

(12) United States Patent
Huang

(10) Patent No.: US 12,668,960 B2
(45) Date of Patent: Jun. 30, 2026

(54) SHOWER HEAD HOLDER BODY, SHOWER HEAD HOLDER, AND SHOWER HEAD HOLDER ASSEMBLY

(71) Applicant: Beijing Kohler Ltd., Beijing (CN)

(72) Inventor: Guangyin Huang, Beijing (CN)

(73) Assignee: Beijing Kohler Ltd., Beijing (CN)

( * ) Notice: Subject to any disclaimer, the term of this patent is extended or adjusted under 35 U.S.C. 154(b) by 203 days.

(21) Appl. No.: 17/985,336

(22) Filed: Nov. 11, 2022

(65) Prior Publication Data

US 2023/0183957 A1 Jun. 15, 2023

(30) Foreign Application Priority Data

Dec. 10, 2021 (CN) ......................... 202123108181.4

(51) Int. Cl.
*E03C 1/06* (2006.01)
*B05B 15/62* (2018.01)

(52) U.S. Cl.
CPC ................ *E03C 1/06* (2013.01); *B05B 15/62* (2018.02)

(58) Field of Classification Search
CPC . B05B 15/60; B05B 15/62; E03C 1/06; E03C 1/066; E05C 9/021; E05C 9/04; E05C 9/041; E05C 9/12; Y10T 292/0834; Y10T 292/1018; Y10T 292/0843; F16B 2/065
USPC ...................................................... 4/605, 615
See application file for complete search history.

(56) References Cited

U.S. PATENT DOCUMENTS

| | | | | |
|---|---|---|---|---|
| 5,481,765 | A * | 1/1996 | Wang | E03C 1/06 4/615 |
| 6,453,486 | B1 * | 9/2002 | Chen | E03C 1/066 4/605 |
| 6,473,916 | B2 * | 11/2002 | Schiødt | E03C 1/06 4/615 |
| 6,502,796 | B1 * | 1/2003 | Wales | E03C 1/06 248/316.1 |
| 7,407,140 | B1 * | 8/2008 | Sen | E03C 1/06 4/615 |
| 10,683,161 | B2 * | 6/2020 | Rodrigues | B65D 85/70 |
| 11,118,332 | B2 * | 9/2021 | Manga | E03C 1/066 |
| D954,900 | S * | 6/2022 | Cocks | D23/223 |
| 11,499,300 | B2 * | 11/2022 | Sierks | B05B 12/0024 |
| 2023/0183957 | A1 * | 6/2023 | Huang | E03C 1/06 248/75 |

FOREIGN PATENT DOCUMENTS

| | | | | |
|---|---|---|---|---|
| CN | 2829901 Y | * 10/2006 | | |
| KR | 20130002208 U | * 4/2013 | | E03C 1/06 |

* cited by examiner

*Primary Examiner* — Jonathan Liu
*Assistant Examiner* — Guang H Guan
(74) *Attorney, Agent, or Firm* — Foley & Lardner LLP

(57) ABSTRACT

A shower holder body, a shower holder, and a shower holder assembly are disclosed. The shower holder body includes a body shell including a mounting channel that can at least partially receive one of a pipe or a rod. The mounting channel includes a shell opening for the pipe or the rod to enter or withdraw from the mounting channel. The shower holder body includes a sealing cover detachably coupled to the body shell at the shell opening. The sealing cover can open or close the shell opening.

17 Claims, 6 Drawing Sheets

SHOWER HEAD HOLDER BODY, SHOWER HEAD HOLDER, AND SHOWER HEAD HOLDER ASSEMBLY

CROSS-REFERENCE TO RELATED PATENT APPLICATIONS

This application claims the benefit of and priority to Chinese Patent Application No. 202123108181.4, filed Dec. 10, 2021, the entire disclosure of which is incorporated herein by reference in its entirety.

TECHNICAL FIELD

The present disclosure relates to the technical field of sanitary showers, and particularly to a shower holder body, a shower holder, and a shower holder assembly.

BACKGROUND

Showerheads can include various configurations including, but not limited to, fixed showerheads and handheld showerheads. A handheld showerhead may couple to a shower environment by one or more holders to allow for a convenient placement of the handheld showerhead. In some circumstances, the shower holder may couple to one or more rails, rods, or other components within the shower environment. To conveniently couple a shower holder with a rail, rod, or other component, or to replace the shower holder, it is advantageous to have a removable shower holder.

SUMMARY

At least one embodiment relates to a shower holder body. The shower holder body includes a body shell including a mounting channel that can at least partially receive one of a pipe or a rod. The mounting channel includes a shell opening for the pipe or the rod to enter or withdraw from the mounting channel. The shower holder body includes a sealing cover detachably coupled to the body shell at the shell opening. The sealing cover can open or close the shell opening.

At least one embodiment relates to a shower holder. The shower holder includes a shower holder body. The shower holder body includes a body shell including a mounting channel that can at least partially receive one of a pipe or a rod. The mounting channel includes a shell opening for the pipe or the rod to enter or withdraw from the mounting channel. The shower holder body includes a sealing cover detachably coupled to the body shell at the shell opening. The shower holder includes a shower carrier for receiving a portion of a showerhead. The shower carrier is connected to one end of the shower holder body.

At least one embodiment relates to a shower holder assembly. The shower holder assembly includes at least one of a pipe or a rod. The shower holder assembly includes a shower holder body. The shower holder body includes a body shell including a mounting channel having a shell opening for the pipe or the rod to enter or withdraw from the mounting channel. The shower holder body includes a sealing cover detachably coupled to the body shell at the shell opening. The pipe or the rod can pass through the mounting channel of the shower holder body. The shower holder body can couple to the pipe or the rod.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
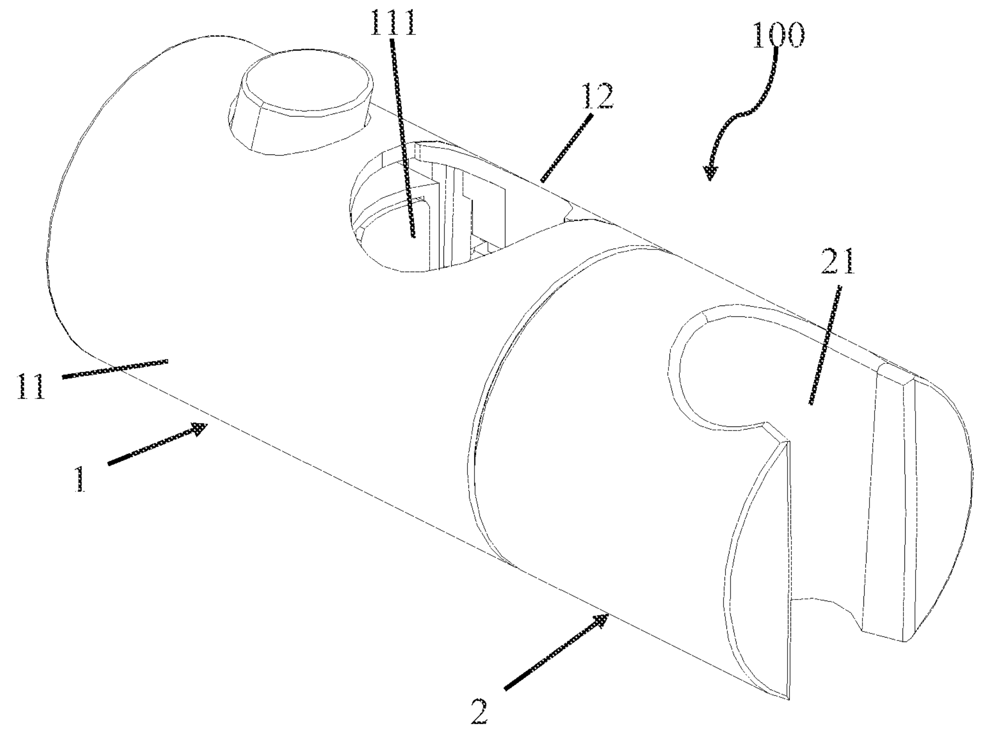
FIG. 1 is a perspective view of a shower holder, according to an exemplary embodiment.

The present disclosure relates to systems and methods of providing a convenient and easy to use shower holder assembly which is capable of convenient assembling and disassembling.

Technical solutions described herein provide a shower holder body, which includes a body shell. The body shell is provided with a mounting channel for a pipe body or a rod body to pass through, and one side of the body shell is provided with a shell opening for the pipe body or the rod body to enter and withdraw from the mounting channel. A sealing cover for opening or closing the shell opening is arranged in the shell opening, and the sealing cover is detachably connected with the body shell. In some embodiments, an inner side of the sealing cover is provided with a telescopic locking mechanism. At least one side of the mounting channel in the body shell is provided with a locking cavity for inserting the telescopic mechanism. The locking mechanism has a retracting state and an extending state. When the locking mechanism is in the extending state, the locking mechanism is at least partially inserted into the locking cavity, and the sealing cover and the body shell are in a locked state. When the locking mechanism is in the retracting state, the locking mechanism withdraws from the locking cavity, and the sealing cover and the body shell are in a released state.

In some embodiments, the locking mechanism includes a sliding rack slidably mounted on the inner side of the sealing cover and a transmission gear located on the inner side of the sealing cover and meshed with the sliding rack. The sealing cover is provided with a rotary knob, and a connecting rod of the rotary knob passes through the sealing cover and is connected with the transmission gear. When the locking mechanism is in the extending state, the sliding rack extends to an outer side of the sealing cover and is inserted into the locking cavity. When the locking mechanism is in the retracting state, the sliding rack retracts to a middle portion of the sealing cover and withdraws from the locking cavity. In some embodiments, the locking mechanism includes two sliding racks, and the two sliding racks are arranged on two opposite sides of the transmission gear. Two sides of the mounting channel in the body shell are respectively provided with one locking cavity. When the locking mechanism is in the extending state, the two sliding racks correspondingly extend to two opposite sides of the sealing cover and are inserted into the two locking cavities. When the locking mechanism is in the retracting state, the two sliding racks retract to the middle portion of the sealing cover and are separated from the two locking cavities.

In some embodiments, the inner side of the sealing cover is provided with a guide sliding groove, and the sliding rack is slidably assembled in the guide sliding groove. In some embodiments, a limiting plate for limiting the retracting sliding rack is arranged in the guide sliding groove. In some embodiments, at least one side of the mounting channel in the body shell is provided with a limiting groove, one side of the sealing cover oriented to the limiting groove is provided with a limiting bulge, and the limiting bulge is detachably assembled in the limiting groove. In some embodiments, one end of the limiting groove is provided with a notch for the limiting bulge to enter and withdraw from the limiting groove, and the notch penetrates through the body shell.

The technical solution further provide a shower holder, which includes the shower holder body and a shower carrier for placing a shower, in which the shower carrier is connected to one end of the shower holder body. The technical solutions further provide a shower holder assembly, which includes a water outlet pipe or a supporting rod. The shower holder assembly includes the shower holder. The water outlet pipe or the supporting rod passes through the mounting channel of the shower holder body, and the shower holder body is mounted on the water outlet pipe or the supporting rod.

Referring generally to the figures, a shower holder body, a shower holder, and a shower holder assembly are provided. The shower holder body includes a shell having a mounting channel that can receive a rod or rail. For example, the shower holder body can be mounted on the water outlet pipe or the supporting rod. The mounting channel can include a shell opening and a sealing cover that can open or close the shell opening. The shower holder body can be assembled with a water outlet pipe or a supporting rod by opening the shell opening, moving the shower holder body so that the water outlet pipe or the supporting rod enters the mounting channel through the shell opening, and then mounting the sealing cover in the shell opening to mount the shower holder body on the water outlet pipe or the supporting rod. When the shower holder body needs to be disassembled or removed from the water outlet pipe or the supporting rod, the sealing cover can be opened, and the shower holder body can be moved so that the water outlet pipe or the supporting rod is removed from the shell opening, and then the shower holder body may be disassembled or removed from the water outlet pipe or the supporting rod. Therefore, according to the shower holder body disclosed herein, the shower holder body and the water outlet pipe or the supporting rod are easily assembled and disassembled, so that a user can replace the shower holder conveniently.

Figure 9:
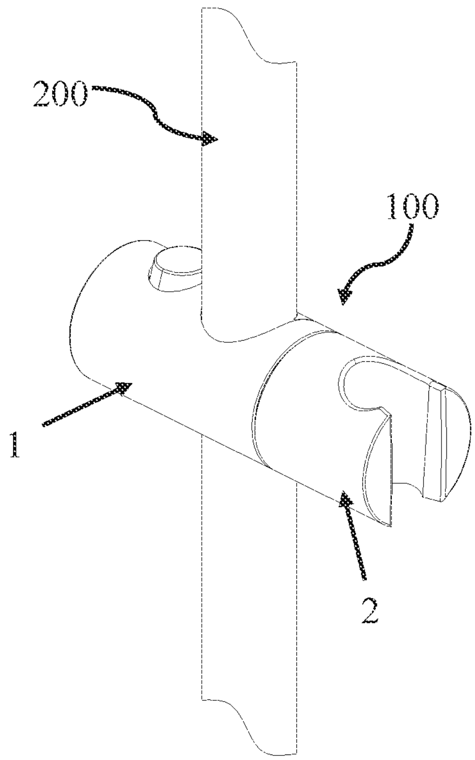
FIG. 9 is a perspective view of a shower holder assembly including the shower holder shown in FIG. 1 coupled to a water outlet pipe, according to an exemplary embodiment.
Figure 10:
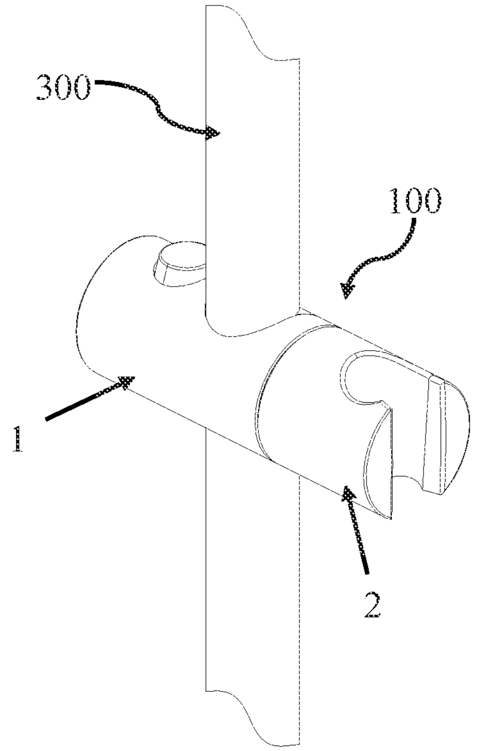
FIG. 10 is a perspective view of a shower holder assembly including the shower holder shown in FIG. 1 coupled to a supporting rod, according to an exemplary embodiment.

Referring briefly to FIGS. 9 and 10, a shower holder 100 according to an embodiment can include a body 1 and a shower carrier 2. For example, the shower carrier 2 may be connected to one end of the shower holder body 1. As described herein, the shower holder 100 can receive a portion of a handheld showerhead (e.g., via the shower carrier 2). The shower holder body 1 may be coupled to one or more components in a shower environment to fix a handheld showerhead relative to a shower environment. For example, the shower holder body 1 can be used for assembling with a water outlet pipe 200, as shown in FIG. 9, or a supporting rod 300, as shown in FIG. 10.

Referring now to FIGS. 1-5, a shower holder 100 includes the shower holder body 1 that includes a body shell 11. The body shell 11 includes a mounting channel 111 for receiving a pipe body or a rod body to pass through. One side of the body shell 11 includes a shell opening 112 for the pipe body or the rod body to enter and/or withdraw from the mounting channel 111. The shower holder body 1 can include one or more slots 21 that can receive a portion of a showerhead (e.g., a handheld showerhead). For example, one end of the shower carrier 2 opposite the shower holder body 1 is provided with a holder slot 21. The holder slot 21 can be used for placing a handle of a shower and plays a role in holding the shower. For example, the holder slot 21 can receive a portion of a handheld showerhead to fix the handheld showerhead relative to the shower holder 100.

The shower holder 100 includes a sealing cover 12 for opening or closing the shell opening 112. For example, the sealing cover 12 can be positioned in, on, and/or near the shell opening 112. The sealing cover 12 can removably couple with the body shell 11 to easily open or close the shell opening 112.

The shower holder body 1 includes the body shell 11 and the sealing cover 12. The body shell 11 is provided with the mounting channel 111 vertically penetrating through the body shell 11. The mounting channel can be used to receive the pipe body or the rod body (e.g., a channel for the pipe body or the rod body to pass through), so as to be assembled with the water outlet pipe 200 or the supporting rod 300. The shell opening 112 on one side of the body shell 11 is used for the water outlet pipe 200 or the supporting rod 300 to enter and withdraw from the mounting channel 111, so as to facilitate an easy assembly. Generally, the shell opening 112 is positioned on a rear side of the body shell 11 (e.g., along one side of the body shell 11). The sealing cover 12 can be removably coupled to the shell opening 112 and can be used for opening or closing the shell opening 112. For example, the sealing cover 12 can be detachably connected with the body shell 11, which can facilitate easy assembly with the body shell 11 to close the shell opening 112 or can facilitate easy separation from the body shell 11 to open the shell opening 112. The sealing cover 12 may be detachably connected with the body shell 11 by a buckle, a locking mechanism, a pin, and/or other ways.

The shower holder body 1 is assembled with the water outlet pipe 200 or the supporting rod 300 by opening the sealing cover 12 and moving the shower holder body 1 so that the water outlet pipe 200 or the supporting rod 300 enters the mounting channel 111 through the shell opening 112. With the outlet pipe 200 or the supporting rod 300 within the mounting channel 111, the sealing cover 12 can be mounted within the shell opening 112 to couple the shower holder body 1 to the water outlet pipe 200 or the supporting rod 300 (e.g., fix the water outlet pipe 200 or the supporting rod 300 relative to the shower holder body 1 in at least one direction). To remove the shower holder body 1 from the water outlet pipe 200 or the supporting rod 300 (e.g., when the shower holder body 1 needs to be disassembled from the water outlet pipe 200 or the supporting rod 300), the sealing cover 12 is opened and the shower holder body 1 is moved away from the pipe 200 or rod 300 so that the water outlet pipe 200 or the supporting rod 300 is removed from the shell opening 112. Thus, the shower holder body 1 is disassembled from the water outlet pipe 200 or the supporting rod 300.

The shower holder 100 can include a jacking mechanism between the shower holder body 1 and the water outlet pipe 200 or the supporting rod 300. The jacking mechanism can include one or more components to facilitate opening or closing the mounting channel 111 via the sealing cover 12. For example, the sealing cover 12 and the body shell 11 can be assembled through the telescopic locking mechanism 13.

As shown in FIGS. 2 to 3 and FIGS. 7 to 8, an inner side of the sealing cover 12 is provided with the telescopic locking mechanism 13. For example, the telescopic locking mechanism 13 can be mounted on the inner side of the sealing cover 12. The telescopic locking mechanism 13 may be a telescopic pin, a telescopic bolt, a telescopic rod, or the like.

In some embodiments, at least one side of the mounting channel 111 in the body shell 11 is provided with a locking cavity 113 for inserting the telescopic locking mechanism 13. The locking cavity 113 can be used operatively with the mounting channel 111 arranged in the body shell 11. For example, the locking cavity 113 is used for inserting an extending part of the locking mechanism 13 to lock the sealing cover 12 and the body shell 11 (e.g., fix the sealing cover 12 with a portion of the body shell 11).

The locking mechanism 13 has a retracting state and an extending state. When the locking mechanism 13 is in the extending state, the locking mechanism 13 is at least partially inserted into the locking cavity 113, and the sealing cover 12 and the body shell 11 are in a locked state (e.g., the sealing cover 12 is at least partially fixed relative to the body shell 11). When the locking mechanism 13 is in the extending state, the sliding rack 131 extends to an outer side of the sealing cover 12 and is inserted into the locking cavity 113.

When the locking mechanism 13 is in the retracting state, the locking mechanism 13 withdraws from the locking cavity 113, and the sealing cover 12 and the body shell 11 are in a released/unlocked state (e.g., the sealing cover 12 can at least partially or entirely be removed from the body shell 11 to open the mounting channel 111). For example, when the locking mechanism 13 is in the retracting state, the sliding rack 131 retracts to a middle portion of the sealing cover 12 and withdraws from the locking cavity 113.

The locking mechanism 13 can include a sliding rack 131 and a transmission gear 132. For example, the locking mechanism 13 can include the sliding rack 131 slidably mounted on the inner side of the sealing cover 12 and the transmission gear 132 located on the inner side of the sealing cover 12 and meshed with the sliding rack 131. The sealing cover 12 can include a rotary knob 14. The rotary knob 14 can include a connecting rod 141 that passes through the sealing cover 12 and is connected with the transmission gear 132. The rotary knob 14 and the connecting rod 141 can facilitate moving the sliding rack 131 via the transmission gear 132.

In some embodiments, the sliding rack 131 and the transmission gear 132 are both located on the inner side of the sealing cover 12. The sealing cover 12 is provided with the rotary knob 14. The rotary knob 14 is provided with the connecting rod 141, the connecting rod 141 passes through a through hole 124 of the sealing cover 12, and the connecting rod 141 is connected with the transmission gear 132. The sliding rack 131 is slidably connected with the sealing cover 12 and the sliding rack 131 is meshed with the transmission gear 132. The sliding rack 131 may be slidably connected with the sealing cover 12 through a guide rail, a sliding groove, or the like.

When the user rotates the rotary knob 14 in a forward direction, the connecting rod 141 drives the transmission gear 132 to rotate in the forward direction and the sliding rack 131 extends to the outer side of the sealing cover 12. Thus, an end portion of the sliding rack 131 is inserted into the locking cavity 113, and the locking mechanism 13 is in the extending state, so that the sealing cover 12 is locked on the body shell 11.

When the user rotates the rotary knob 14 in a reverse direction, the connecting rod 141 drives the transmission gear 132 to rotate in the reverse direction, the sliding rack 131 retracts to the middle portion of the sealing cover 12. Thus, the sliding rack 131 is separated from the locking cavity 113, the locking mechanism 13 is in the retracting state, and the sealing cover 12 and the body shell 11 are in the released state, so that the sealing cover 12 may be removed from the body shell 11. The combination of the sliding rack 131, the transmission gear 132 and the rotary knob 14 is simple in structure, convenient to assemble, and convenient for the user to operate.

In some embodiments, as shown in FIGS. 2 to 3 and FIGS. 7 to 8, the locking mechanism 13 includes two sliding racks 131, and the two sliding racks 131 are arranged on two opposite sides of the transmission gear 132 (e.g., meshed on opposite positions). For example, the two sliding racks 131 are arranged on upper and lower sides of the transmission gear 132. Two sides of the mounting channel 111 in the body shell 11 are each respectively provided with one locking cavity 113. For example, left and right sides of the mounting channel 111 in the body shell 11 are respectively provided with one locking cavity 113.

When the user rotates the rotary knob 14 in a forward direction, the connecting rod 141 drives the transmission gear 132 to rotate in the forward direction, the two sliding racks 131 respectively extend to the outer side of the sealing cover 12, and end portions of the two sliding racks 131 are inserted into the locking cavities 113 on corresponding sides, so that the sealing cover 12 is firmly locked on the body shell 11. For example, when the locking mechanism 13 is in the extending state, the two sliding racks 131 correspondingly extend to two opposite sides of the sealing cover 12 and are inserted into the two locking cavities 113, as shown in at least FIG. 8.

Figure 7:
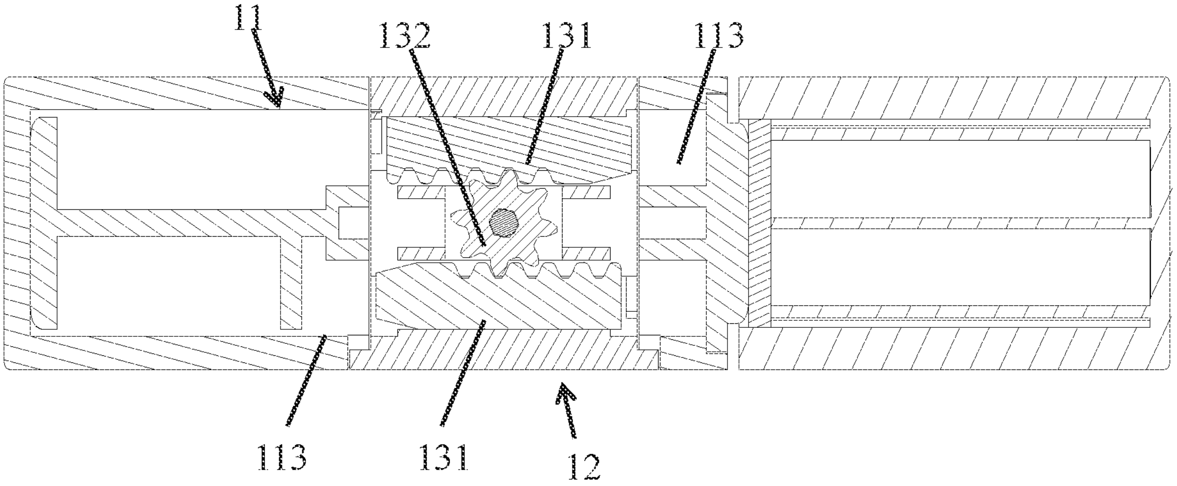
FIG. 7 is a cross-sectional view of the sealing cover and a body shell of the shower holder shown in FIG. 1 in an unlocked state, according to an exemplary embodiment.
Figure 8:
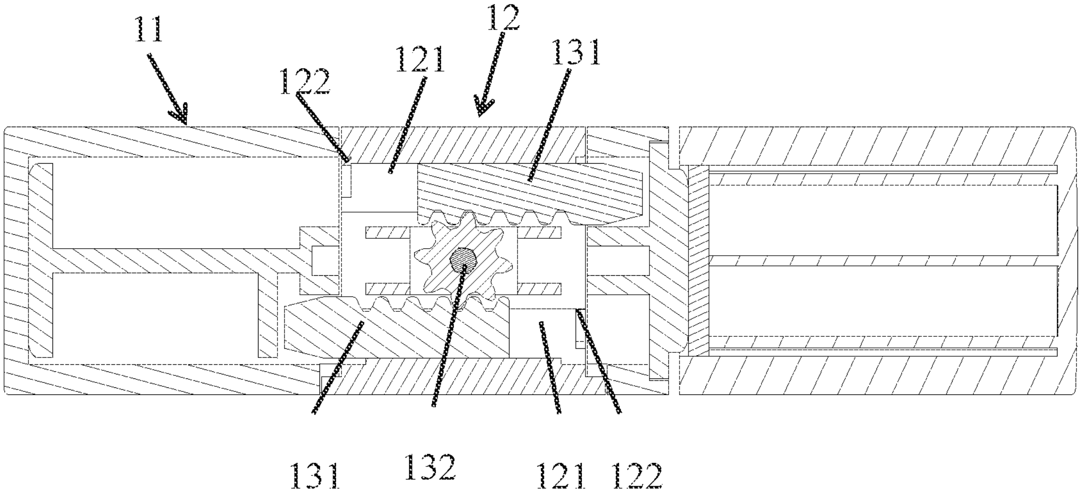
FIG. 8 is a cross-sectional view of the sealing cover and the body shell of the shower holder shown in FIG. 1 in a locked state, according to an exemplary embodiment.

When the locking mechanism 13 is in the retracting state, the two sliding racks 131 both retract to the middle portion of the sealing cover 12 and are separated from the two locking cavities 113, as shown in at least FIG. 7.

In some embodiments, as shown in FIGS. 5 to 8, the inner side of the sealing cover 12 is provided with a guide sliding groove 121, and the sliding rack 131 is slidably assembled in the guide sliding groove 121. The guide sliding groove 121 is oriented within the locking cavity 113, which provides a guide for sliding of the sliding rack 131.

In some embodiments, as shown in FIGS. 5 to 8, a limiting plate 122 for limiting the retracting sliding rack 131 is arranged in the guide sliding groove 121. The limiting plate 122 may be arranged in the guide sliding groove 121 or arranged at one end of the guide sliding groove 121. When the sliding rack 131 retracts in place, the sliding rack 131 engages (e.g., contacts) the limiting plate 122.

Figure 3:
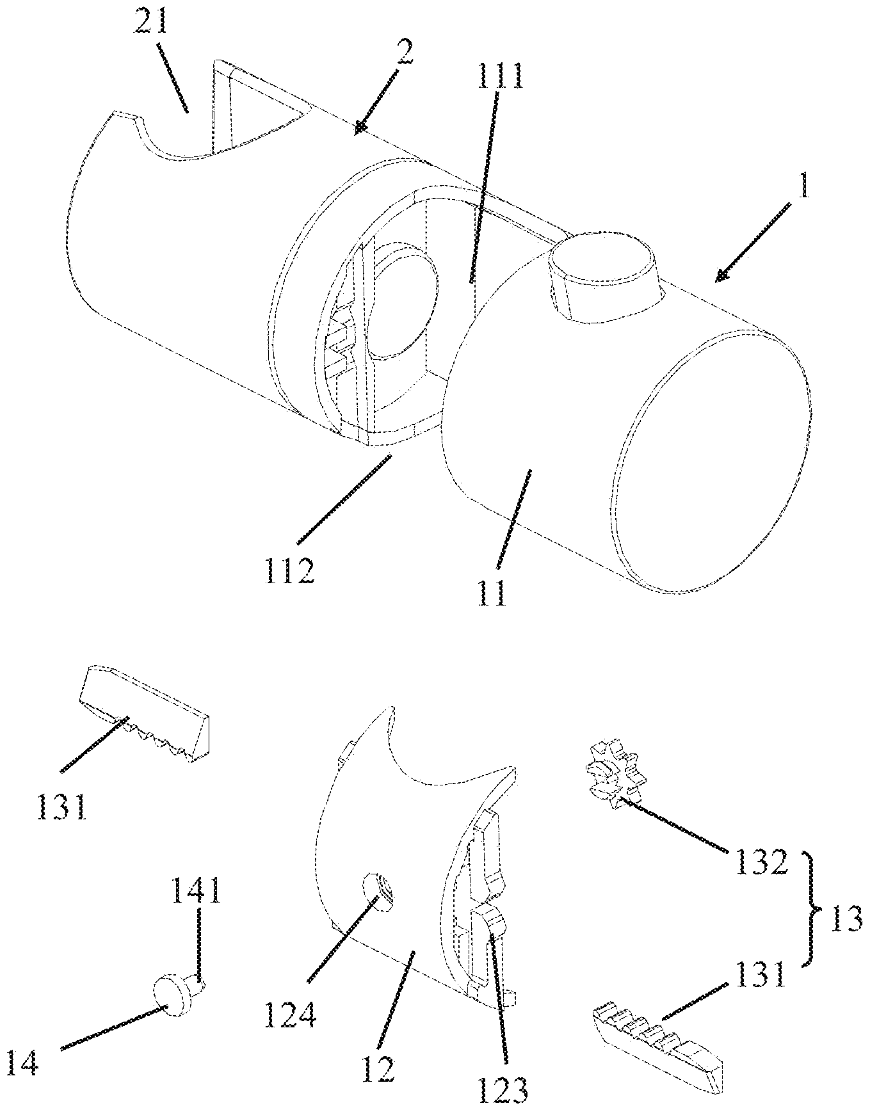
FIG. 3 is an exploded perspective view of the shower holder shown in FIG. 1, according to an exemplary embodiment.
Figure 4:
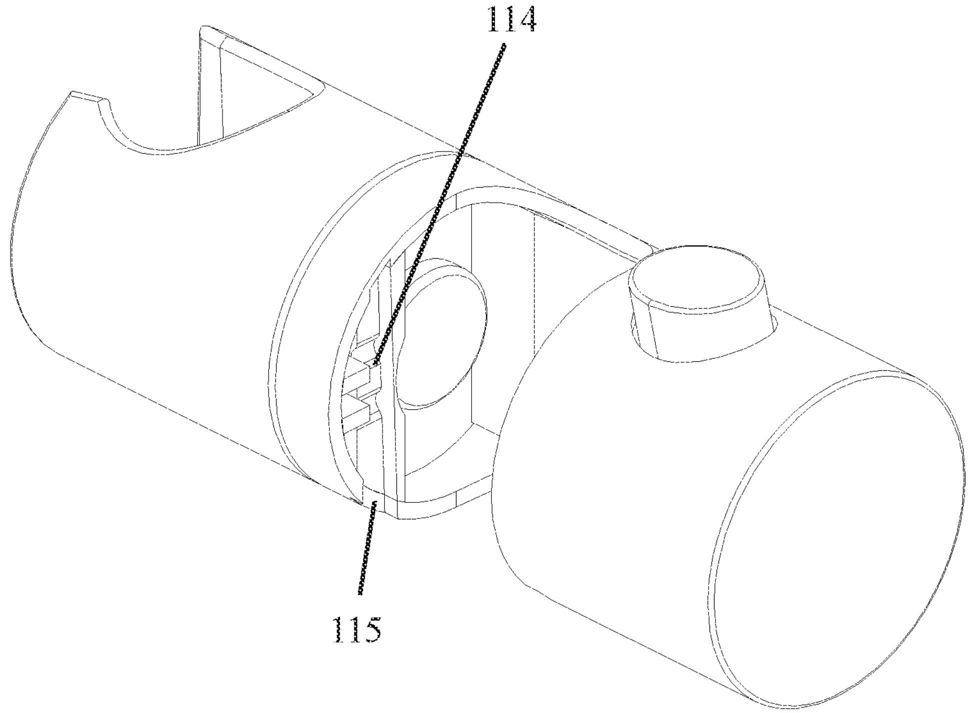
FIG. 4 is a perspective view of the shower holder shown in FIG. 1 with a sealing cover removed, according to an exemplary embodiment.
Figure 5:
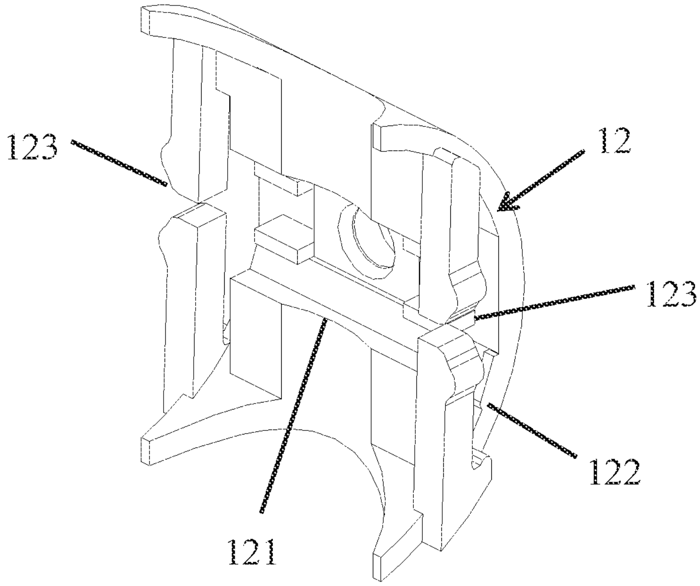
FIG. 5 is a perspective view of the sealing cover of the shower holder shown in FIG. 1, according to an exemplary embodiment.
Figure 6:
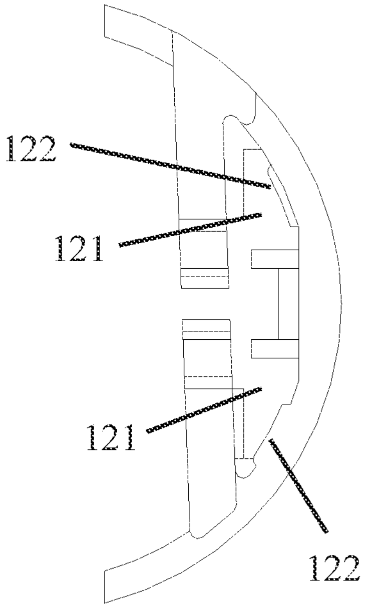
FIG. 6 is a side view of a sealing cover of the shower holder shown in FIG. 1, according to an exemplary embodiment.

In some embodiments, as shown in FIGS. 3 to 5, at least one side of the mounting channel 111 in the body shell 11 is provided with a limiting groove 114. One side of the sealing cover 12 is provided with a limiting bulge 123, and the limiting bulge 123 is detachably assembled in the limiting groove 114 when the sealing cover 12 is oriented to engage with the limiting groove 114 (e.g., at least one portion of the limiting bulge 123 contacts the limiting groove 114). An opening of the limiting groove 114 is oriented within a portion of the mounting channel 111, and the limiting groove 114 is used for matching with the limiting bulge 123 of the sealing cover 12 to limit the sealing cover 12. For example, the limiting groove 114 can assist in assembling the sealing cover 12 on the body shell 11. The limiting bulge 123 may be an elastic plate, an elastic bump, or the like. The limiting bulge 123 may be pressed into the limiting groove 114.

In some embodiments, as shown in FIG. 4, one end of the limiting groove 114 is provided with a notch 115 for the limiting bulge 123 to enter and withdraw from the limiting groove 114, and the notch 115 extends at least partially into the body shell 11. When the sealing cover 12 needs to be assembled, the limiting bulge 123 is aligned with the notch 115, and the sealing cover 12 is pushed upwardly so that the limiting bulge 123 enters the limiting groove 114. When the sealing cover 12 needs to be disassembled, the sealing cover 12 is pushed downwardly, so that the limiting bulge 123 is separated from the limiting groove 114 through the notch 115.

The limiting groove 114 and the limiting bulge 123 may be used in combination with the locking mechanism 13. For example, when the sealing cover 12 needs to be assembled, the limiting bulge 123 is aligned with the notch 115 and the sealing cover 12 is pushed upwardly, so that the limiting bulge 123 enters the limiting groove 114. After the sealing cover 12 is pushed in place, the locking mechanism 13 is operated to be in the extending state, so as to improve a locking effect on the sealing cover 12.

When the sealing cover 12 needs to be disassembled, the locking mechanism 13 is operated to be in the retracting state, and then the sealing cover 12 is pushed downwardly so that the limiting bulge 123 is separated from the limiting groove 114 through the notch 115.

Figure 2:
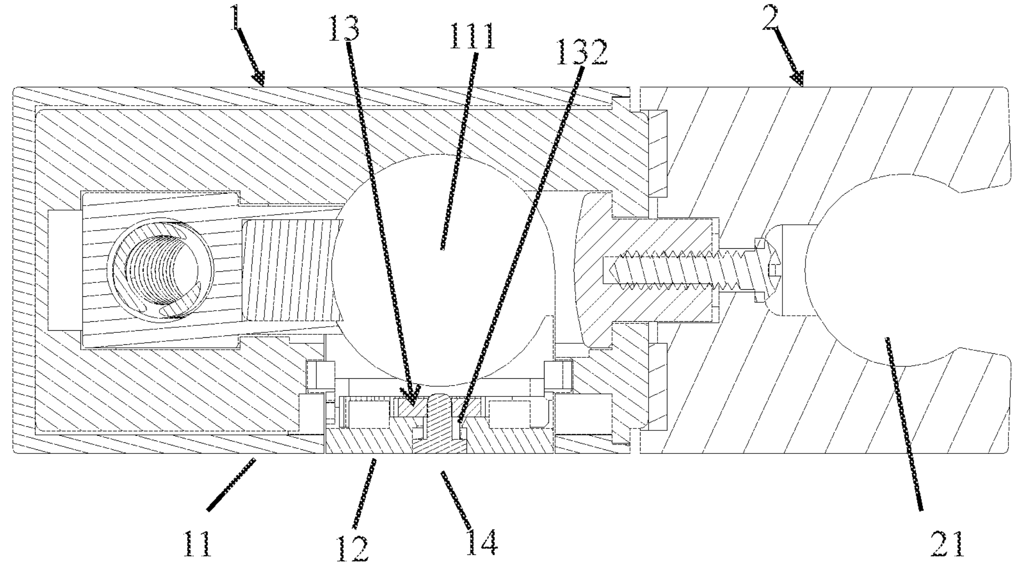
FIG. 2 is a top-down cross-sectional view of the shower holder shown in FIG. 1, according to an exemplary embodiment.

In some embodiments, the shower holder body 1 can include one or more pressure members (e.g., fasteners, springs, clamps, or other components) that can facilitate fixing the shower holder body 1 relative to a rod or rail received within the mounting channel 111. For example, as shown in FIG. 2, the shower holder body 1 can include a pressure member that can apply pressure to (e.g., clamp) a rod within the mounting channel 111 responsive to adjusting one or more fasteners.

Referring back to FIGS. 9 and 10, a shower holder assembly provided by an embodiment of the present disclosure includes a water outlet pipe 200 or a supporting rod 300 and the shower holder 100.

As described herein, the water outlet pipe 200 or the supporting rod 300 passes through the mounting channel 111 of the shower holder body 1 when the sealing cover 12 is removed, and the shower holder body 1 is mounted on the water outlet pipe 200 or the supporting rod 300 when the sealing cover 12 is replaced.

The water outlet pipe 200 or the supporting rod 300 can be or can include various components including, but not limited to, a shower rail, a shower rod, a lifting rod, a telescopic rod, or other components. While the mounting channel 111 and the holder slot 21 are shown as round in shape, it should be understood that the mounting channel 111 and/or the holder slot 21 can be or can include various other shapes to receive various rods, shafts, handles, rails, or other components of a shower system. Further, the shower holder 100 can be used for various other showerheads including, but not limited to, fixed showerheads.

The above technical solutions may be combined as required to achieve the best technical effect. By adopting the technical solutions above, the technical solutions provided herein have the following beneficial effects. According to the shower holder body, the shower holder and the shower holder assembly disclosed by the present disclosure, the shower holder body and the water outlet pipe or the supporting rod are assembled and disassembled conveniently, so that the user can replace the shower holder conveniently.

The present shower holder body has several advantages over conventional techniques. For example, conventional techniques typically only include a through hole to receive a rod or rail without any sealing covers. Therefore if a conventional shower holder is damaged, the whole water outlet pipe or the whole supporting rod needs to be disassembled in order to replace it, thus being extremely inconvenient. In view of this, the shower holder body, shower holder and shower holder assembly of the present disclosure provide several advantages including convenience and ease of assembly. For example, in the shower holder body provided by the present disclosure, the shower holder body 1 and the water outlet pipe 200 or the supporting rod 300 are assembled and disassembled conveniently, so that a user can replace the shower holder 100 conveniently.

Specific embodiments of the present disclosure are further described hereinafter with reference to the drawings. The same parts are denoted by the same reference numerals. It should be noted that the terms “front”, “back”, “left”, “right”, “up” and “down” used in the following description refer to the directions in the drawings, and the terms “inner” and “outer” refer to the directions towards or far away from geometric centers of specific parts respectively.

The above description is only the principles and the preferred embodiments of the present disclosure. It should be pointed out that, for those of ordinary skills in the art, several other modifications may be made on the basis of the principle of the present disclosure, which should also be regarded as falling into the scope of protection of the present disclosure.

Those of ordinary skills in the art should understand that: those described above are only specific embodiments of the present disclosure, but are not intended to limit the present disclosure. Any modifications, equivalent substitutions and improvements made in the subject of the present disclosure shall all fall within the scope of protection of the present disclosure.

As utilized herein with respect to numerical ranges, the terms “approximately,” “about,” “substantially,” and similar terms generally mean +/−10% of the disclosed values, unless specified otherwise. As utilized herein with respect to structural features (e.g., to describe shape, size, orientation, direction, relative position, etc.), the terms “approximately,” “about,” “substantially,” and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. For example, the shower holder described herein can be used with a fixed showerhead or other various types of showerheads. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A shower holder body, comprising:

a body shell including a mounting channel, the mounting channel defining a shell opening and configured to receive one of a pipe or a rod, the body shell including a locking cavity disposed on a side of the body shell, at least one side of the body shell including a limiting groove having an opening oriented within a portion of the mounting channel;

a sealing cover detachably coupled to the body shell at the shell opening of the mounting channel to open or close the shell opening of the mounting channel to selectively fix the pipe or the rod to the body shell in at least one direction, at least one side of the sealing cover including a limiting bulge detachably assembled in the limiting groove; and a locking mechanism disposed on an inner side of the sealing cover;

wherein the locking mechanism includes a sliding rack slidably coupled to the sealing cover and configured to be extended into and retracted out of the locking cavity;

wherein when the sliding rack is extended into the locking cavity, the limiting bulge is detachably assembled in the limiting groove; and wherein when the sliding rack is retracted out of the locking cavity, the limiting bulge is detachably assembled in the limiting groove.

2. The shower holder body according to claim 1, wherein:

when the sliding rack is extended into the locking cavity, the sealing cover and the body shell are in a locked state; and when the sliding rack is retracted out of the locking cavity, the sealing cover and the body shell are in an unlocked state.

3. The shower holder body according to claim 1, wherein:

the locking mechanism includes a transmission gear located on the inner side of the sealing cover and meshed with the sliding rack; and the sealing cover includes a rotary knob having a connecting rod that passes through the sealing cover and is coupled to the transmission gear.

4. The shower holder body according to claim 1, wherein:

the sliding rack is a first sliding rack of two sliding racks, wherein the two sliding racks are positioned on opposite sides of a transmission gear;

the locking cavity is a first locking cavity disposed on a first side of the mounting channel, the mounting channel including a second locking cavity disposed on a second side of the mounting channel;

when the locking mechanism is in an extending state, the two sliding racks correspondingly extend to two opposite sides of the sealing cover and are inserted respectively into the two locking cavities; and when the locking mechanism is in a retracting state, the two sliding racks retract to a middle portion of the sealing cover and are separated from the two locking cavities.

5. The shower holder body according to claim 1, wherein:

the inner side of the sealing cover includes a guide sliding groove; and the sliding rack is slidably assembled in the guide sliding groove.

6. The shower holder body according to claim 5, wherein a limiting plate for limiting the sliding rack is positioned in the guide sliding groove.

7. The shower holder body according to claim 1, wherein one end of the limiting groove is provided with a notch for the limiting bulge to enter and withdraw from the limiting groove.

8. The shower holder body according to claim 7, wherein the notch extends at least partially into the body shell.

9. The shower holder body according to claim 1, wherein the mounting channel is configured to receive the pipe or the rod through the shell opening of the mounting channel.

10. A shower holder, comprising:

a shower holder body comprising:

a body shell including a mounting channel, the mounting channel defining and configured to receive one of a pipe or a rod, the body shell including a locking cavity disposed on a side of the body shell, at least one side of the body shell including a limiting groove having an opening oriented within a portion of the mounting channel;

a sealing cover detachably coupled to the body shell at the shell opening of the mounting channel to open or close the shell opening of the mounting channel to selectively fix the pipe or the rod to the body shell in at least one direction, at least one side of the sealing cover including a limiting bulge detachably assembled in the limiting groove; and a locking mechanism disposed on an inner side of the sealing cover;

wherein the locking mechanism includes a sliding rack slidably coupled to the sealing cover and configured to be extended into and retracted out of the locking cavity;

wherein when the sliding rack is extended into the locking cavity, the limiting bulge is detachably assembled in the limiting groove; and wherein when the sliding rack is retracted out of the locking cavity, the limiting bulge is detachably assembled in the limiting groove; and a shower carrier for receiving a portion of a showerhead to fix the showerhead relative to the shower holder body;

wherein the shower carrier is connected to one end of the shower holder body.

11. The shower holder according to claim 10, wherein:

when the sliding rack is extended into the locking cavity, the sealing cover and the body shell are in a locked state; and when the sliding rack is retracted out of the locking cavity, the sealing cover and the body shell are in an unlocked state.

12. The shower holder according to claim 10, wherein:

the locking mechanism includes a transmission gear located on the inner side of the sealing cover and meshed with the sliding rack; and the sealing cover includes a rotary knob having a connecting rod that passes through the sealing cover and is coupled to the transmission gear.

13. The shower holder according to claim 10, wherein:

the shower carrier includes a holder slot configured to receive a handle of the showerhead; and the holder slot is separate from the mounting channel.

14. A shower holder assembly, comprising:

at least one of a pipe or a rod; and a shower holder body comprising:

a body shell including a mounting channel, the mounting channel defining a shell opening and configured to receive the pipe or the rod, the body shell including a locking cavity disposed on a side of the body shell, at least one side of the body shell including a limiting groove having an opening oriented within a portion of the mounting channel;

a sealing cover detachably coupled to the body shell at the shell opening of the mounting channel to open or close the shell opening of the mounting channel to selectively fix the pipe or the rod to the body shell in at least one direction, at least one side of the sealing cover including a limiting bulge detachably assembled in the limiting groove; and a locking mechanism disposed on an inner side of the sealing cover;

wherein the locking mechanism includes a sliding rack slidably coupled to the sealing cover and configured to be extended into and retracted out of the locking cavity;

wherein when the sliding rack is extended into the locking cavity, the limiting bulge is detachably assembled in the limiting groove; and wherein when the sliding rack is retracted out of the locking cavity, the limiting bulge is detachably assembled in the limiting groove;

wherein the pipe or the rod is configured to pass through the mounting channel of the shower holder body; and wherein the shower holder body is configured to couple to the pipe or the rod.

15. The shower holder assembly according to claim 14, wherein:

when the sliding rack is extended into the locking cavity, the sealing cover and the body shell are in a locked state; and when the sliding rack is retracted out of the locking cavity, the sealing cover and the body shell are in an unlocked state.

16. The shower holder assembly according to claim 15, wherein:

the locking mechanism includes a transmission gear located on the inner side of the sealing cover and meshed with the sliding rack; and the sealing cover includes a rotary knob having a connecting rod that passes through the sealing cover and is coupled to the transmission gear.

17. The shower holder assembly according to claim 14, wherein a length of the pipe or the rod is greater than a length of the mounting channel.

* * * * *